(12) United States Patent
Steenhoek et al.

(10) Patent No.: US 11,080,552 B2
(45) Date of Patent: Aug. 3, 2021

(54) SYSTEMS AND METHODS FOR PAINT MATCH SIMULATION

(71) Applicant: AXALTA COATING SYSTEMS IP CO., LLC, Wilmington, DE (US)

(72) Inventors: Larry E. Steenhoek, Wilmington, DE (US); Robert V. Canning, Jr., Bear, DE (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 62 days.

(21) Appl. No.: 16/555,835

(22) Filed: Aug. 29, 2019

(65) Prior Publication Data

US 2020/0089991 A1 Mar. 19, 2020

Related U.S. Application Data

(60) Provisional application No. 62/732,838, filed on Sep. 18, 2018.

(51) Int. Cl.
| | |
|---|---|
| *G06K 9/62* | (2006.01) |
| *G06T 7/90* | (2017.01) |
| *G06F 16/50* | (2019.01) |
| *G06T 7/10* | (2017.01) |

(52) U.S. Cl.
CPC ............ *G06K 9/6211* (2013.01); *G06F 16/50* (2019.01); *G06T 7/10* (2017.01); *G06T 7/90* (2017.01); *G06T 2207/10008* (2013.01)

(58) Field of Classification Search
CPC .. G06T 7/10; G06T 7/90; G06F 16/50; G06K 9/6211

See application file for complete search history.

(56) References Cited

U.S. PATENT DOCUMENTS

| | | |
|---|---|---|
| 8,929,646 B2 | 1/2015 | Rodrigues et al. |
| 2008/0235224 A1* | 9/2008 | Joseph Rodrigues .. G06F 16/54 |

(Continued)

FOREIGN PATENT DOCUMENTS

WO 2011163583 A1 12/2011

OTHER PUBLICATIONS

European Patent Office, European Search Report in Application No. EP19194780, dated Dec. 12, 2019.

*Primary Examiner* — Myron Wyche
(74) *Attorney, Agent, or Firm* — Lorenz & Kopf LLP

(57) ABSTRACT

A system for displaying one or more images to select one or more matching formulas to match color and appearance of a target coating of an article includes a computing device, a display device, a host computer connected to the computing device, one or more data input devices, a first database containing repair formulas, color characteristics, and appearance characteristics, a second database containing identification information of an article or a three-dimensional model of an article or a three-dimensional mapping of a geometry of a part of an article, and a computer program product accessible to the computing device and/or the host computer and performing a computing process to retrieve at least one preliminary matching formula from the first database, select one article or a three-dimensional mapping of a geometry of one article from the second database, generate individual matching images, and display the individual matching images on the display device.

20 Claims, 4 Drawing Sheets

(56) References Cited

U.S. PATENT DOCUMENTS

2013/0071015 A1* 3/2013 Rodrigues ............... G01J 3/504
382/162
2015/0228002 A1* 8/2015 Berger ............... G06Q 30/0627
705/26.63

* cited by examiner

SYSTEMS AND METHODS FOR PAINT MATCH SIMULATION

CROSS-REFERENCE TO RELATED APPLICATION

This application claims the benefit of U.S. Provisional Application No. 62/732,838, filed Sep. 18, 2018, which is hereby incorporated in its entirety by reference.

TECHNICAL FIELD

The description is directed to a system for displaying images of various colors and appearances of an article and the use thereof. The description is particularly directed to a system for displaying one or more images to select one or more matching formulas to match color and appearance of a target coating of an article. The description is even further directed to a method for displaying one or more images to select one or more matching formulas to match color and appearance of a target coating of an article.

BACKGROUND

Surface coatings such as monocoat, clearcoat/colorcoat, and tricoat are favored for the protection and decoration of substrates such as vehicle bodies. The surface coatings can utilize one or more pigments or effect pigments to impart the desired color or appearance, such as solid, metallic, pearlescent effect, gloss, or distinctness of image, to the vehicle bodies. Metallic flakes, such as aluminum flakes and pearlescent flakes are commonly used to produce coatings having flake appearances such as texture, sparkle, glint and glitter as well as the enhancement of depth perception in the coatings imparted by the flakes.

Repair of such coatings that have been damaged, e.g., in a collision or stone chipping or scratches, may be difficult in that a vehicle repair body shop or a refinisher may have to go to great lengths to repeatedly try out and to locate a best aftermarket refinish coating composition that matches the color and appearance of the vehicle's original coating, also known as original equipment manufacturing (OEM) coating. While each coating composition used in a vehicle's original coating is manufactured to a given color standard, so that, in theory, all vehicles painted with a given coating composition should appear the same color and appearance, due to a host of different variables, such as changing atmospheric conditions and use of different application techniques, the appearance of a given coating composition may actually vary from plant to plant and over different times of any year. Consequently, vehicles manufactured at one plant may appear a different color than vehicles painted with the same coating composition at another plant. A number of refinish matching coating compositions must therefore be developed for each OEM coating composition.

Various color matching techniques have been developed in the past to aid the selection of the correct matching coating composition to refinish a vehicle, but at least some may suffer from certain significant limitations. For instance, visual tools such as refinish color chips have been used on many occasions to find a suitable match for the vehicle that needs refinishing. However, visual color matching is time-consuming, cumbersome and subject to many errors as a result of poor lighting conditions, operator variances, or variation to the original standard by the paint manufacturer. Another system involves the use of vehicle data, such as its make, model year and manufacturers paint code. The paint code is used to identify all the different aftermarket refinish matching coating compositions and corresponding coating formulas created for that paint code. Additional information further defining the matching coatings resulted from the matching coating compositions is associated to each formula which helps the refinisher define which is the best match for the vehicle of that make and model year in question. Such information is gathered from a number of sources and resides in either electronic or printed formats. Accessing such a bank of information is very time-consuming and does not always lead to the correct coating match.

A further system commonly employed involves the use of a computer controlled colorimeter or spectrophotometer which measures the color values of an undamaged area of the coating on the vehicle and compares these color values stored in a database that contains color data for various refinish matching coatings and corresponding matching formulas. From that comparison, the computer locates one or more preliminary matching formulas for the vehicle's original coating color and appearance within an acceptable tolerance. An example of such method is described in U.S. Pat. No. 7,145,656. Said method, however, requires measured color values and cannot identify matching formulas based on vehicle identification information.

An even further development is to use both the measured color values and vehicle identifying information to locate potential preliminary matching formulas from a refinish matching coating database. One example of such system is described in U.S. Pat. No. 6,522,977. In such system, sample coatings resulting from each of the preliminary matching formulas are prepared and test sprayed. Color match is then visually determined. In most cases, the preliminary matching formulas need to be adjusted manually and repeatedly by trial and error until a match is achieved.

Thus, a continuing need still exists for selecting one or more matching formulas to match color and appearance of a target coating of an article allowing a more precise customization of the selected matching formulas and with minimum requirement for repeated testing, manual adjustment and trial.

BRIEF SUMMARY

An aspect is directed to a system for displaying one or more images to select one or more matching formulas to match color and appearance of a target coating of an article, said system comprising:
  a first processor;
  a display device;
  a second processor connected to the first processor;
  one or more data input devices;
  a first database containing interrelated repair formulas, color characteristics, and appearance characteristics;
  a second database containing identification information of at least one article, a three-dimensional model of the at least one article or a three-dimensional mapping of a geometry of at least a part of a surface of the at least one article; and
  a computer program product that is accessible to the first processor and/or the second processor and performs a computing process comprising the steps of:
  retrieving one or more preliminary matching formulas from the repair formulas of the first database based on signals received from the data input device;
  selecting one article or a three-dimensional mapping of a geometry of one article from the second database and receiving a marked section of a surface of the article;

generating individual matching images containing the marked section and an unmarked section adjacent to the marked section, wherein the individual matching images are generated in the marked section based on the color characteristics, appearance characteristics, and one article or a three-dimensional mapping of a geometry of one article selected from the second database and interrelated to each of the preliminary matching formulas; and displaying the individual matching images on the display device.

Another aspect is directed to a method that is carried out by one or more processors for displaying one or more images to select one or more matching formulas to match color and appearance of a target coating of an article, said method comprising:

retrieving, by one or more processors, one or more preliminary matching formulas from a multitude of repair formulas from a first memory storing a first database, wherein the first database comprises interrelated repair formulas, color characteristics, and appearance characteristics;

selecting, by one or more processors, one article or a three-dimensional mapping of a geometry of one article from a second memory storing a second database and marking a part of a surface of the article as a marked section, wherein the second database contains identification information of at least one article, a three-dimensional model of the at least one article or a three-dimensional mapping of a geometry of at least a part of a surface of the at least one article;

generating, by one or more processors, individual matching images containing the marked section and an unmarked section adjacent to the marked section, wherein the individual matching images are generated in the marked section based on the color characteristics, appearance characteristics, and one article or a three-dimensional mapping of a geometry of one article selected from the second database and interrelated to each of the preliminary matching formulas; and displaying the individual matching images on the display device.

Another aspect is directed to a system for computing one or more images indicating one or more matching formulas to match color and appearance of a target coating of an article, said system comprising:

a first processor configured to receive input signals from at least one data input device;

a memory that stores a first database containing interrelated repair formulas, color characteristics, and appearance characteristics;

the memory storing a second database containing identification information of at least one article, a three-dimensional model of the at least one article or a three-dimensional mapping of a geometry of at least a part of a surface of the at least one article; and a computer program product that is accessible to the first processor and performs a computing process comprising:

retrieving one or more preliminary matching formulas from the repair formulas of the first database based on the input signals;

selecting one article or a three-dimensional mapping of a geometry of one article from the second database and receiving a marked section of a surface of the article;

generating individual matching images containing the marked section and an unmarked section adjacent to the marked section, wherein the individual matching images are generated in the marked section based on the color characteristics, appearance characteristics, and one article or a three-dimensional mapping of a geometry of one article selected from the second database and interrelated to each of the preliminary matching formulas; and transmitting the individual matching images for being displayed on a display device.

DETAILED DESCRIPTION

Figure 1:
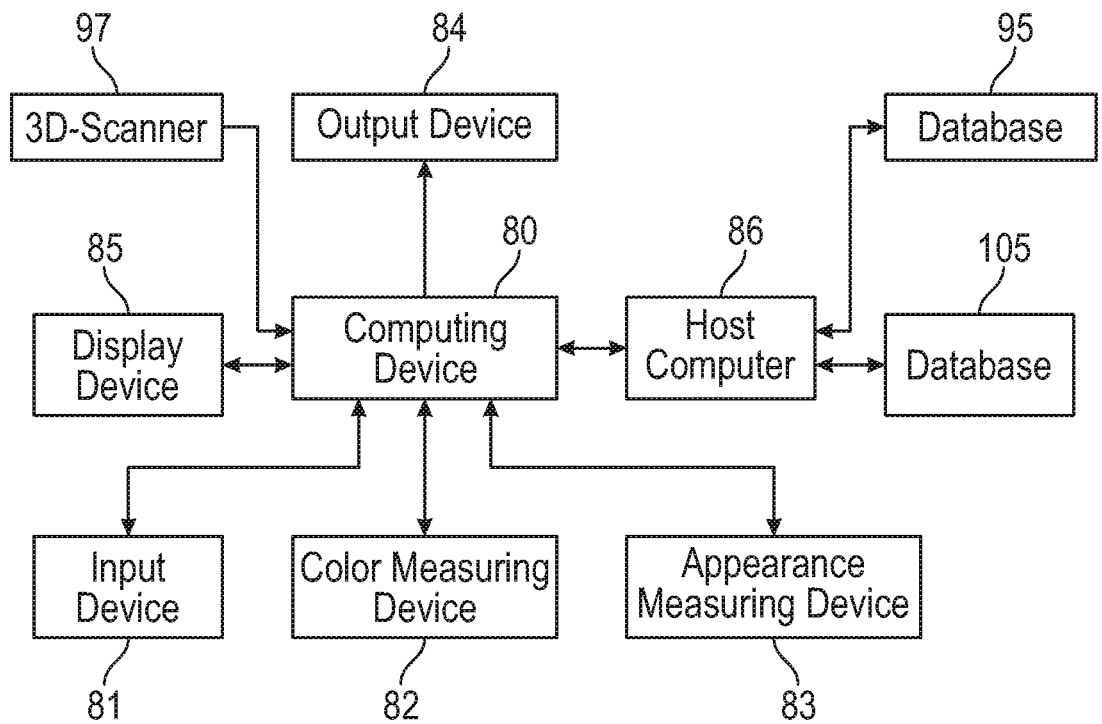
FIG. 1 shows a representative hardware configuration of a system according to an exemplary embodiment.

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "pigment" or "pigments" used herein refers to a colorant or colorants that produce color or colors. A pigment can be from natural and synthetic sources and made of organic or inorganic constituents. A pigment may also include metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments.

Gonioapparent flakes refer to flakes which change color or appearance, or a combination thereof, with change in illumination angle or viewing angle. Metallic flakes, such as aluminum flakes are examples of gonioapparent flakes.

The term "dye" means a colorant or colorants that produce color or colors. Dye is usually soluble in a coating composition.

"Appearance" used herein refers to (1) the aspect of visual experience by which a coating is viewed or recognized; and (2) perception in which the spectral and geometric aspects of a coating is integrated with its illuminating and viewing environment. In general, appearance includes texture, sparkle, or other visual effects of a coating, especially when viewed from varying viewing angles and/or with varying illumination angles.

The term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

Each of the terms "vehicle", "automotive", "automobile", "automotive vehicle", and "automobile vehicle" refer to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein refers to a desktop computer, a laptop computer, a pocket PC, a personal digital assistant (PDA), a handheld electronic processing device, a smart phone that combines the functionality of a PDA and a mobile phone, an iPod, an iPod/MP Player, a tablet computer, or any other electronic devices that can process information automatically. A computing device may have a wired or wireless connection to a database or to another computing device. A computing device may be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device may further be a subunit of another device. Examples of such a subunit can be a processing chip in an imaging device, a spectrophotometer, or a goniospectrophotometer. A computing device may be connected to a display device, such as a monitor screen.

A "portable computing device" includes a laptop computer, a pocket PC, a personal digital assistant (PDA), a handheld electronic processing device, a mobile phone, a smart phone that combines the functionality of a PDA and a mobile phone, a tablet computer, an iPod, an iPod/MP Player, or any other stand alone or subunit devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, Wi-Max device, local area network (LAN) device, 3G/4G/5G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

The term "memory" relates to a computer readable storage device or media and may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor in executing the steps described herein.

An imaging device refers to a device that can capture images under a wide range of electromagnetic wavelengths including visible or invisible wavelengths. Examples of the imaging device include, but not limited to, a still film optical camera, a digital camera, an X-Ray camera, an infrared camera, an analog video camera, and a digital video camera. A digital imager or digital imaging device refers to an imaging device that captures images as digital signals. Examples of the digital imager include, but not limited to, a digital still camera, a digital video camera, a digital scanner, and a charge coupled device (CCD) camera. An imaging device can capture images in black and white, gray scale, or various color levels. A digital imager may be preferred. Images captured using a non-digital imaging device, such as a still photograph, can be converted into digital images using a digital scanner and can also be suitable. The imaging device can further comprise an illumination device that provided illuminations at a single angle or multiple angles.

A display device can be a computer monitor, a projector, a TV screen, a personal digital assistant (PDA) device, a cell phone, a smart phone that combines PDA and cell phone, an iPod, an iPod/MP Player, a flexible thin film display, or any other devices that can display information or images based on digital signals. The display device can also be a printing device that prints, based on digital signals, information or image onto papers, plastics, textiles, or any other surfaces that are suitable for printing the information or images onto. The display device can also be a duel functional display/data input device, such as a touch screen.

The term "repair formula" refers to a collection of information or instruction, based upon that, a repair composition can be prepared. A refinish coating formula is a typical example of the repair formula. A repair formula can also be a formula to repair small damage of a vehicle coating at some points of original manufacturing (OEM) production line wherein a refinish formula has not yet been developed for that particular vehicle. Other examples include, but are not limited to, a formula and optionally an instruction to mix and produce a particular engineer polymer with desired color and appearance, or a formula and instruction to mix and produce a composition of desired color and appearance to repair kitchen counter top made from synthetic materials.

Figure 2:
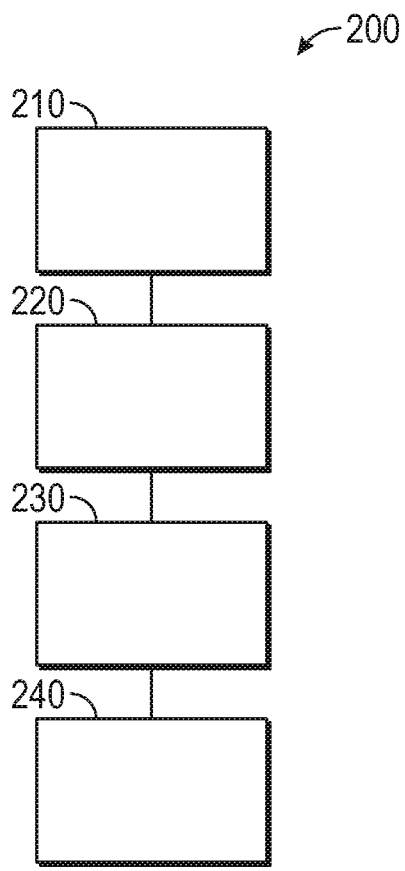
FIG. 2 shows a flowchart of a method according to an exemplary embodiment.

This disclosure is directed to a system and a method for displaying one or more matching formulas to match color and appearance of a target coating of an article, particularly to match a coating of a vehicle. Representative functional blocks of the system are shown in FIG. 1 and process flow charts of the method are shown in FIG. 2. It is understood that those skilled in the art may produce variations of the functional blocks and flow charts, rearrange sequential orders of the steps or make other various modifications without departing from the scope and spirit of this disclosure.

A representative hardware configuration of the system is shown in FIG. 1, wherein the system comprises a computing device 80 (which may generally be referred to as the second processor, applies to this embodiment and all other embodiments described herein); a display devise 85, such as a monitor screen; a 3D-scanner 97, a first database 95 and a second database 105 stored in a memory; one or more data input devices 81. Examples of the input devices include, but not limited to, a wired or wireless keyboard, a touch screen, a barcode reader or a scanner. One or more input devices can be functionally coupled to the computing device as determined necessary by those skilled in the art. The system can further comprise a color measuring device 82, and optionally an appearance measuring device 83. The system can further comprise an output device 84. The output device can be a printer, a monitor screen or a data output portal that can output data such as selected formulas. The output device can be further coupled to other computing devices or databases or a mixing device that can mix coating compositions according to the selected formulas. The input device, the output device, the color measuring device, or the appearance measuring device can be functionally connected to the computing device through wired or wireless connections. The computing device is connected to a host computer 86 (generally referred to as the first processor, applies to this embodiment and all other embodiments described herein) via a wired or wireless connection. In particular, the computing device 80 is connected to the host computer 86 via a data network. The data network may be a public data network (like the Internet) or a private network.

The host computer 86 is connected to the first database 95 and the second database 105. The first and second databases 95, 105 may be loaded into a storage of the host computer 86 such as a hard drive or a memory card of the computing device. The databases 95, 105 can also be accessed from the computing device through wired or wireless connections.

The computing device 80 may be a local computer operated by a refinisher or another operator. The host computer 86 is a remote unit and spaced apart from the computing device 80. In particular, the host computer 86 may be accessible to multiple computing devices 80 that may be located at different sites. In other words, the host computer 86 may be accesses by computing devices 80 located in different repair shops or repair factories.

However, it is noted that the computing device 80 and the host computer 86 may be functional units that are located at the same site, even in the same housing. For example, the function of the computing device 80 may be implemented as a first computing process and the function of the host computer 86 may be implemented as a second computing process. The first and second computing processes may be executed by the same physical processor. Alternatively, the first and second computing processes are executed by different cores of a multi-core processor. The computing device 80 and the host computer 86 may also be implemented as different structural components that are located in the same housing. For example, the functions of the computing device 80 may be implemented in a first microcontroller while the functions of the host computer 86 may be implemented in a second microcontroller, with the first and second microcontroller being communicatively coupled as described with reference to FIG. 1.

The first database 95 contains interrelated repair formulas, color characteristics, and appearance characteristics. The second database 105 contains identification information of at least one article, a three-dimensional model of the at least one article or a three-dimensional mapping of a geometry of at least a part of a surface of the at least one article. The computing device 80 or the host computer 86 are configured to carry out specific steps and/or functions. The computing device 80 and/or the host computer 86 are instructed by instructions of a computer program product to carry out those steps and/or functions. The computer program product may be accessible to the computing device 80 and/or the host computer 86 and instructs these devices to perform a computing process comprising the steps of: retrieving one or more preliminary matching formulas from the repair formulas of the first database 95 based on signals received from the data input device 81; selecting one article or a three-dimensional mapping of a geometry of one article from the second database 105 and receiving a marked section of a surface of the article; generating individual matching images containing the marked section and an unmarked section adjacent to the marked section, wherein the individual matching images are generated in the marked section based on the color characteristics, appearance characteristics, and one article or a three-dimensional mapping of a geometry of one article selected from the second database and interrelated to each of the preliminary matching formulas; and displaying the individual matching images on the display device 85.

The signals received from the input device 81 can be entered by an operator. For example, a skilled refinisher can identify a number of blue color coating formulas with varying shades that can potentially match a blue color of a classic vehicle wherein no vehicle identification number is available for that vehicle. Preliminary formulas for those blue colors can be retrieved by entering into the computing device 80 via the input device 81 either formula numbers or names, color names or numbers, make of the vehicle, vehicle manufacturing year, or a combination thereof, as known to those skilled in the art.

The data input device 81 can be selected from a digital input device, such as a wired keyboard, a wireless keyboard, a digital writing pad, a touch screen, an input portal that can be connected to an electrical device or another computer, or any other digital devices that can input data into the computing device; an optical input device, such as a barcode reader, a scanner, a digital camera, a digital video camera, or any other optical devices that can input data into the computing device; an electromagnetic input device, such as a radio receiver, an RFID (radio frequency identification) receiver, an infrared data receiver, or any other devices that can receive data through a broad range of electromagnetic wavelengths; or a combination thereof. Each of the data input devices may further require necessary adaptors or couplings in order to input data into the computing device, wherein those adaptors or couplings can be readily determined by those skilled in the art. Those adaptors or couplings can further be wired or wireless.

The display device 85 can be selected from a digital display device, such as a computer monitor, a PDA, a computer, a cell phone, a smart phone, or a TV; an optical display device, such as a projector; a print display, such as a printer; or a combination thereof. The display device can also be a duel functional display/data input device. One example of such duel functional device is a touch screen of a computer or a PDA.

In other words, a section of the surface of the article can be marked or selected by a user. This marked section typically corresponds to the section to be repaired. The marked section is rendered with the preliminary matching formulas (one at a time) while the unmarked section that is adjacent to the marked section is rendered with the target coating. The target coating is the actually measured color of the article. Therefore, based on this approach, the preliminary matching formula and the target coating are rendered on a true 3D-model of the article so that the color and appearance of the article is shown more realistic and a possible mismatch between the preliminary matching formula and the target coating can be detected before repairing the marked section. For example, the unrepaired portions (unmarked sections) of the article are rendered according to a model generated from a 3-angle color measurement of an unrepaired portion of the article, and the repaired portion (marked section) of the article are rendered according to a model generated using 3-angle color data for the selected preliminary matching formula.

The color measuring device 82 can be a colorimeter, a spectrophotometer, or a goniospectrophotometer. Any suitable colorimeter or spectrophotometer can be used. A goniospectrophotometer is also known as multi-angle spectrophotometer. Any suitable goniospectrophotometers can be used.

The appearance measuring device 83 can comprise an imaging device for capturing one or more appearance images of the target coating, a computing device and a computer program product residing in the computing device for generating appearance data from the appearance images. An imaging device refers to a device that can capture images under a wide range of electromagnetic wavelengths including visible or invisible wavelengths. Aforementioned imaging devices, such as a still film optical camera, a digital camera, an X-Ray camera, an infrared camera, an analog video camera, and a digital video camera are suitable for the system and method of this disclosure. Computer program products based on the methods described in aforementioned U.S. Pat. No. 6,952,265 or U.S. patent application Ser. No. 60/848,757, filed on Oct. 2, 2006, are suitable for the system and method of this disclosure.

The 3D-scanner may have one or more visual detecting devices. In case the 3D-scanner has multiple visual detecting devices, these may be arranged spaced apart from each other so as to capture the geometry of a surface from different points of view. The 3D-scanner is configured to capture the geometry and the contour of an object. Based on the captured geometry, a 3D CAD (computer-aided design) model may be generated. The 3D CAD model may then be used to generate an individual matching image with the preliminary matching formula. Thus, the appearance of the preliminary matching formula with the specific geometry of an object can be analyzed. In other words, the repair formulas in accordance with the preliminary matching formula is applied to the specific 3D-geometry of an object and the visual appearance of the repair formula on this specific object is simulated.

According to an embodiment, the system for displaying one or more images to select one or more matching formulas to match color and appearance of a target coating of an article comprises a computing device 80, a display device 85, a host computer 86 connected to the computing device 80, one or more data input devices 81, a first database 95 containing interrelated repair formulas, color characteristics, and appearance characteristics, a second database 105 containing identification information of at least one article, a three-dimensional model of the at least one article or a three-dimensional mapping of a geometry of at least a part of a surface of the at least one article, and a computer program product that is accessible to the computing device and/or the host computer. The computer program product performs a computing process comprising the steps of: retrieving one or more preliminary matching formulas from the repair formulas of the first database based on signals received from the data input device; selecting one article or a three-dimensional mapping of a geometry of one article from the second database and receiving a marked section of a surface of the article; generating individual matching images containing the marked section and an unmarked section adjacent to the marked section, wherein the individual matching images are generated in the marked section based on the color characteristics, appearance characteristics, and one article or a three-dimensional mapping of a geometry of one article selected from the second database and interrelated to each of the preliminary matching formulas; and displaying the individual matching images on the display device.

The color characteristics and the appearance characteristics are related to the repair formula. In a second database, specific 3D-models of objects are stored, and the repair formulas may be applied to the specific three-dimensional geometry according to the 3D-models of the second database. The geometry of an object has an influence on the appearance of color on that object. Therefore, with the system and the method described herein, the appearance of the repair formulas applied to the specific models of an object are more realistic. The repair formula is not compared to the target coating (that is the existing color or coating of an object) on a blank chip, for example, but on the specific geometry of the object to be repaired.

The identification information of the article can be selected from, for example, a catalog number for the article, a name or part of the name of the article, or a combination thereof. In the case for a vehicle, the identification information can be model year, manufacturing site information, manufacturers paint code, optionally manufacturing date for said vehicle, or a combination thereof. The identification information can also be a vehicle identification number (VIN), or a part thereof. The identification information is stored in the database, preferably interrelated to other information such as repair formulas, color characteristics, and optionally appearance characteristics of the target coating of the article.

In one example, the computing device 80 is a local client while the host computer 86 is a remote server; the computationally heavy rendering operations are carried out by the host computer. The host computer may be a customized computer for rendering graphics operations so that the rendering steps may be executed in far less time compared to standardized client computers.

The first and second databases may also be joint or combined into a single database entity. This single database entity may be made up of one or more tables containing the required information. However, in order to achieve an appropriate result of paint match simulation, color information (repair formula) and article shape information (the 3D-geometry of the object) are used. The article shape information may be retrieved from an actual 3D-model of an article or, alternatively, from a 3D-scan of an object to be repaired.

In a further example, the system further comprises a 3D-scanner 97 configured to acquire a three-dimensional mapping of a geometry of at least a part of the surface of the article and to transmit said geometry to the second database.

The 3D-scanner may be a portable device that is connected to the computing device 80 in a wired or wireless manner. The 3D-scanner may be used to acquire the 3D-geometry of an article or object. This is especially helpful if the 3D-model of the object to be repaired does not exist in the second database. The acquired 3D-geometry is transmitted to the second database and stored therein for direct or later use. In the example of FIG. 1, the 3D-scanner acquires the 3D-geometry of an object. The acquired data are transmitted to the computing device 80 which then transmits the data to the host computer 86. The host computer 86 may process the received data to generate the 3D-geometry. However, this step may also be carried out by the computing device 80. Once the 3D-geometry is generated, the repair formula may be applied to it by rendering operations carried out by the host computer 86.

In a further example, the computing process further comprises the steps of identifying a repair area of the article and displaying the individual matching image on the display device with the identified repair area adopting the preliminary matching formula.

The area to be repaired is identified and this area is colored in accordance to the matching formula. With the actual 3D-information of the selected model, the user gets an accurate impression of the repaired article. The area may be identified by an operator or user of the system by selecting an area on the display unit. The area may be selected by drawing a polygon covering the surface of the selected model.

In a further example, the system further comprises a color measuring device functionally coupled to the computing device for obtaining color data of the article, wherein the obtained color data represent a target coating of the article. The system may optionally comprise an appearance measuring device functionally coupled to the computing device for obtaining appearance data of the article. The computing process may further comprise the steps of receiving the color data, and optionally receiving the appearance data, wherein the individual matching images are generated in the unmarked section of the article based on the target coating, and optionally based on the appearance data.

In an example, the color measuring device is selected from a colorimeter, a spectrophotometer, or a goniospectrophotometer.

In an example, the appearance measuring device comprises an imaging device.

In an example, the computing process further comprises the steps of indicating a blend region on the surface of the article and rendering a color blend from the repair area to the color data of the article obtained by the color measuring device.

Thus, a color blend between the preliminary matching formula and the actual color of the article is simulated in order to identify if the repair and blending can be done without any mismatch between the repair formula and the target coating.

In a further example, the computing device and the host computer are located remote from each other.

As already described above, the host computer may particularly be a remote server with high processing power so that the computationally intense rendering can be done remote from the client computer.

In a further example, the second database is configured to receive three-dimensional models of articles.

Thus, the second database may be updated with 3D-geometries of articles. For example, a 3D-CAD model of the surface of a car may be loaded into the second database. From this 3D-CAD model, specific surface regions may be selected to be repaired. When doing so, the repair formulas are rendered with the actual shape of the surface region to be repaired.

In an example, the three-dimensional model of the at least one article is partitioned into multiple segments; and the computing process comprises the step of selecting one segment of the multiple segments and applying the preliminary matching formula to the selected segment.

Thus, specific panels or parts of the surface may be selected for applying the preliminary matching formula.

In an example, the computing process comprises the step of applying different lighting conditions to the individual matching image.

This enables an operator to examine the result of the repair formula under different lighting conditions and to choose an appropriate repair formula. Under certain lighting conditions, the repair formula might look identical to the target coating. However, when changing the lighting conditions, the repair formula may look different than the target coating. Examining the repair formula and the target coating under different lighting conditions may reduce the risk of color mismatch.

In an example, the computing process comprises the step of rotating the article on the display device and rendering the individual matching image from different viewing angles.

This enables the operator to view the result of the repair formula from different viewing angles. Different considerations may apply as described above with reference to different lighting conditions. Under different viewing angles, the repair formula and the target coating may look different.

In an example, the computing device is a portable computing device.

In an example, the computing device is connected to the host computer via a wired or wireless network.

In an example, the display device is selected from a digital display device, an optical display device, a print display device, or a combination thereof.

In an example, the data input device is selected from a digital input device, an optical input device, an electromagnetic input device, or a combination thereof.

In an example, each of the individual matching images is displayed as realistic matching image.

The systems and methods described herein allow to select a paint formula that, when applied to an article being repaired will closely match the color and appearance of the article (the target coating) being repaired. The article being repaired may be a vehicle or other object. The best match is selected from a group of candidate formulas, i.e., preliminary matching formulas. In accordance with the systems and methods described herein, the preliminary matching formulas are applied to the real 3D-geometry of an article. The 3D-geometry is retrieved from a database. It may be sufficient for the rendering to use a section of the surface of the article to be repaired, wherein the used section contains the portion to be repaired and adjacent parts which are color match critical. When using a 3D-scanner to acquire the geometry of the article to be repaired, the need for an extensive library of models of all articles is eliminated.

FIG. 2 shows a flow chart 200 of an exemplary method for displaying one or more images to select one or more matching formulas to match color and appearance of a target coating of an article. The method comprises the following steps: in a first step 210, retrieving one or more preliminary matching formulas from a multitude of repair formulas from a first database, wherein the first database comprises interrelated repair formulas, color characteristics, and appearance characteristics; in a second step 220, selecting one article or a three-dimensional mapping of a geometry of one article from a second database and marking a part of a surface of the article as a marked section, wherein the second database contains identification information of at least one article, a three-dimensional model of the at least one article or a three-dimensional mapping of a geometry of at least a part of a surface of the at least one article; in a third step 230, generating individual matching images containing the marked section and an unmarked section adjacent to the marked section, wherein the individual matching images are generated in the marked section based on the color characteristics, appearance characteristics, and one article or a three-dimensional mapping of a geometry of one article selected from the second database and interrelated to each of the preliminary matching formulas; and in a fourth step 240 displaying the individual matching images on the display device.

The preliminary matching formulas may be selected in the first step 210 so that these matching formulas are close to the target coating or color of the article to be repaired. In other words, the preliminary matching formulas are a group of candidate coatings similar to the actual color of the article.

In the second step 220, the article may be selected based on identification information. For a vehicle, said identification information may comprise model year, manufacturing site information, manufacturers paint code, and optionally manufacturing date for said vehicle. The identification information can be obtained from vehicle identification number (VIN), vehicle identification label, an optical vehicle data source, an electromagnetic vehicle data source of said vehicle, or a combination thereof.

In the third step 230, individual matching images are generated based on the color and appearance characteristics and further based on the article or three-dimensional mapping of the geometry of an article selected from the second database.

The color and appearance characteristics can be obtained through measurements of a test coating resulted from the corresponding formula or through mathematical calculation and modeling. Typically, the color characteristics can comprise L,a,b, or L*,a*,b*, or X,Y,Z values known to those skilled in the art and can be obtained by using a colorimeter, a spectrophotometer, or a goniospectrophotometer. Examples of appearance characteristics include, but not limited to, texture, metallic, pearlescent effect, gloss, distinctness of image, flake appearances such as texture, sparkle, glint and glitter as well as the enhancement of depth perception in the coatings imparted by the flakes, especially produced by metallic flakes, such as aluminum flakes. In one example, flake appearance characteristics can be obtained by measurements, calculations and modeling, or a combination of measurements and calculations as described in a commonly owned U.S. Pat. No. 6,952,265, which is hereby incorporated by reference in its entirety. Color and appearance characteristics may contain one or more illumination angels or view angles. Each coating formula stored in the database can be interrelated to one or more sets of information, such as vehicle identification information, color characteristics, and appearance characteristics. The term "interrelated" refers to a database structure that related information can be searched and retrieved. For example, a coating formula and its color or appearance characteristics can be retrieved based on related vehicle identification information. The same formula and related vehicle identification information, on the other hand, can also be retrieved based on color or appearance characteristics. Color or appearance characteristics, or both color and appearance characteristics can also be retrieved based on vehicle identification information.

General methods for generating images of coating colors on a computer monitor based on variables in coating formulas are known to those skilled in the art, such as the method described in WO 2004/044850. In brief, the images are generated by converting the L,a,b, or L*,a*,b*, values of the color characteristics to XYZ values if needed and calculating corresponding R, G, B values from the XYZ values. The R, G, B values may further be modified or calibrated to fit various display devices.

Images representing multiple viewing angles can be generated, herein referred to as realistic matching images. Methods for generating realistic images of coating color and appearance based on coating formulas and color and appearance characteristics are described in commonly owned U.S. patent application Ser. No. 11/58,847, filed on Oct. 27, 2006, which is incorporated by reference in their entirety. In brief, the images are generated by converting the L,a,b, or L*,a*, b*, values at at least three angles to corresponding XYZ values, calculating a range of aspecular angles required for display, and calculating corresponding R, G, B values from the corresponding XYZ values and the angles for display. The R, G, B values may further be modified or calibrated to fit various display devices.

In the fourth step 240, the individual matching images or realistic matching images are displayed on a display device. Each of the matching images can be displayed as an image representing a single viewing angle or a realistic matching image representing multiple viewing angles, such as a curved view. Algorithms and methods for displaying matching images are described in aforementioned U.S. patent application Ser. No. 11/58,847, filed on Oct. 27, 2006, which is incorporated by reference.

It is to be understood that the functions of the system described with reference to FIG. 1 may be implemented as method steps.

In another embodiment, the method further comprises the step of selecting one or more matching formulas from the preliminary matching formulas by comparing the individual matching image and the target coating. With the individual matching images displayed, either one at a time or a plurality of images displayed simultaneously, on a display device, such as a handheld display device, for example a PDA, a laptop or a tablet computer, a refinisher or those skilled in the art can easily compare the matching images with the target coating of the vehicle. Based on the comparison between the individual matching images and the target coating of the vehicle, a selection of the matching formula or a plurality of matching formulas can be made and recorded.

Once the matching formula is selected, the refinisher can prepare a matching coating composition according to the matching formula and repair the coating damage using the matching coating composition according to methods and processes well known to those skilled in the art. By displaying matching images of coatings on a 3D-geometry of an article, a viewer can expect that the color and the appearance will be suitably representative to that of an actual coating applied to an article or part thereof with that 3D-geometry.

The system and method of this disclosure thus reduces the needs for repeated testing and trial and increases accuracy of color and appearance match and productivity.

In another embodiment, the method further comprises the steps of: 1) obtaining color data of the target coating, 2) generating a target image based on the color data and appearance characteristics as well as the 3D-geometry of the article stored in the first and second databases, and 3) displaying the target image and the individual matching images.

The color data can be obtained by measuring reflectance of a target coating using a color measurement device, such as a colorimeter, a spectrophotometer, or a goniospectrophotometer. Color data may include spectral characteristics such as chroma, hue, lightness, darkness, and the like. Any suitable colorimeter or spectrophotometer can be used. Portable spectrophotometers are preferred as they can be readily positioned over coated substrate surfaces of various shapes and sizes. If desired, one can measure the reflectance over several portions of the target coating to average out the reflectance of the target coating. Spectral reflectance data can be obtained using spectrophotometer. In a typical spectrophotometer, a light beam of known intensity can be directed towards the target coating and reflectance from the target coating is sequentially measured at at least one, preferably at at least three, aspecular angles at preset wavelengths. Alternatively, a light beam of known intensity can be sequentially directed at at least one, preferably at at least three, incident angles towards the target coating and reflectance from the target coating is then measured at preset wavelengths with a single detecting device so as to provide measurements at different aspecular angles, depending on the angle of illumination. A goniospectrophotometer is a spectrophotometer having the capability of measuring with a variety of illuminating and viewing angles using bidirectional geometry. A goniospectrophotometer is also known as a multi-angle spectrophotometer. Any suitable Goniospectrophotometers can be used. Gonioapparent colors should be measured at multiple angles, preferably 3 to 5, or more. For solid colors, a single aspecular angle is sufficient, typically 45 degrees. A common practice for solid colors is to illuminate at a single angle and measure the diffuse reflectance using an integrating sphere, capturing the light reflected at all angles from the target coating. The reverse method of illuminating diffusely and measuring at a single angle yields equivalent results. Diffuse reflectance is preferred when the target coating has a textured surface.

For example, measurements are taken at 10 nm wavelength intervals from 400 nm to 700 nm wavelengths. A plot of the percent reflectance as a function of wavelength is referred to as a "spectral curve" or spectral reflectance data. For a solid color (non-flake or non-gonioapparent color, such as that lacking metallic flakes), one spectral curve is typically sufficient to measure solid color properties. Other common geometries of measurement are diffuse illumination with 0° or 8° viewing or the reverse. If a target coating having flakes, i.e., gonioapparent color is being matched, reflectance measurements at additional angles would be necessary. ASTM E-2194 recommends three angles, 15°, 45°, and 110° as measured away from the aspecular reflection (see FIG. 7). DIN 6175-2 recommends up to five angles, all within this same range of angles. measurement devices may provide measurements at 15°, 25°, 45°, 75°, and 110°. The measurement data or spectral reflectance data can be converted into $L^*,a^*,b^*$ or $L,C,h$ values as described in detail in U.S. Patent publication No. 2006/0181707, which is herein incorporated by reference.

An image of the target coating, hereafter referred to as a target image, can be generated based on the color data and appearance characteristics stored in the first database 95 and the information about the article stored in the second database 105 (see FIG. 1). The first database may comprise interrelated refinish coating formulas, manufacturers paint codes, color and appearance characteristics, and alphanumeric characters assigned to each of the refinish coating formulas that indicate the model year and manufacturing site information, and optionally manufacturing date for which the refinish coating formulas are applicable. The appearance characteristics can be retrieved by using the vehicle identification information or part thereof, such as the model year and manufacturing site information, and optionally manufacturing date. The appearance characteristics retrieved can provide information such as flake size, type or ratio of different flakes if a mixture of different flakes is present. The appearance characteristics and the color data can be implemented into the algorithms described in aforementioned U.S. patent application Ser. No. 11/58,847 to generate the target image. Both the target image and the aforementioned individual matching images can be displayed on the display device. The target image can also be generated as a realistic target image representing multiple viewing angles and then displayed.

Each of the matching images can be displayed as an image representing a single viewing angle or a realistic matching image, such as a curved view. The target image can also be displayed as an image representing a single viewing angle or as a realistic target image representing multiple viewing angles.

The target image and each of the matching images can be displayed close to each other or displayed immediately adjacent to each other so that the target image can have common boarders with one or more matching images.

The method described herein is applicable to stationary and mobile retrieval platforms. Colors are selectable by body panel to simulate actual repair with reference to the specific shape and geometry of the article. Rendering and computational heavy operations are done by a remote or offsite host computer or web service. The processes of the remote host computer may be distributed to more than one physical computer. The host computer provides one or more animated sets of fully rendered images that can be displayed on the display device connected to the computing device. Specific areas or surfaces of the article may be selected for the rendering process in order to minimize render time. For example, when rendering a car, wheels, light trims, etc. may be eliminated before rendering.

The method is, basically, a three-step approach: in a first step, preliminary matching formulas are selected; in a second step, a model of an article comprising 3D-geometry information is selected; in a third step, a view is selected, and the blend is simulated. When using a 3D-scanner, a part of a vehicle surface to be repaired is scanned to obtain the real 3D-geometry. Subsequently, color information is applied to that vehicle surface by rendering the article with the preliminary matching formula, and a proposal (image) is provided and presented to an operator or user.

Figure 3:
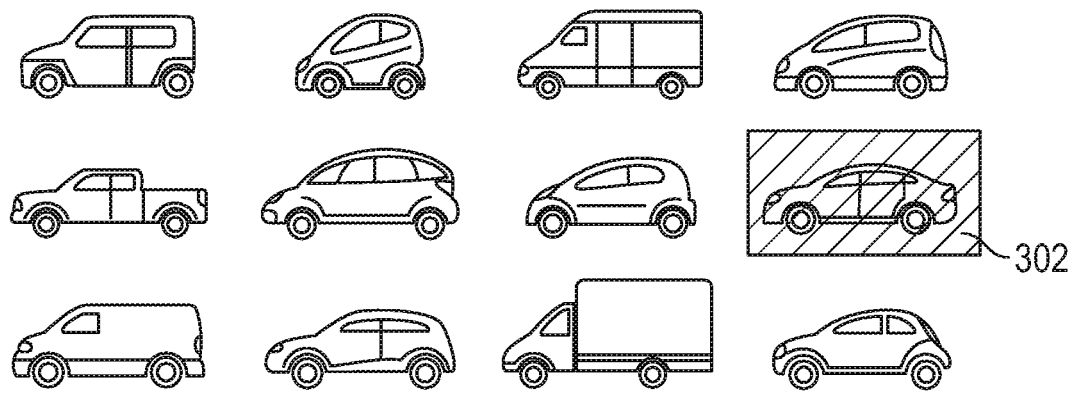
FIG. 3 shows an exemplary object selection.

FIG. 3 shows a selection of common type vehicle types. One of these vehicles can be selected for generating an individual matching image with a specific preliminary matching formula. In the example shown, the most-right vehicle in the second line indicated with 302 is selected. However, the selection of vehicles can be expanded by loading 3D-geometry models of additional vehicles or by importing the 3D-geometry of an article from a 3D-scanner.

The selection of articles is contained in the second database. Each of the articles has assigned a 3D-CAD model and not just a picture.

Figure 4:
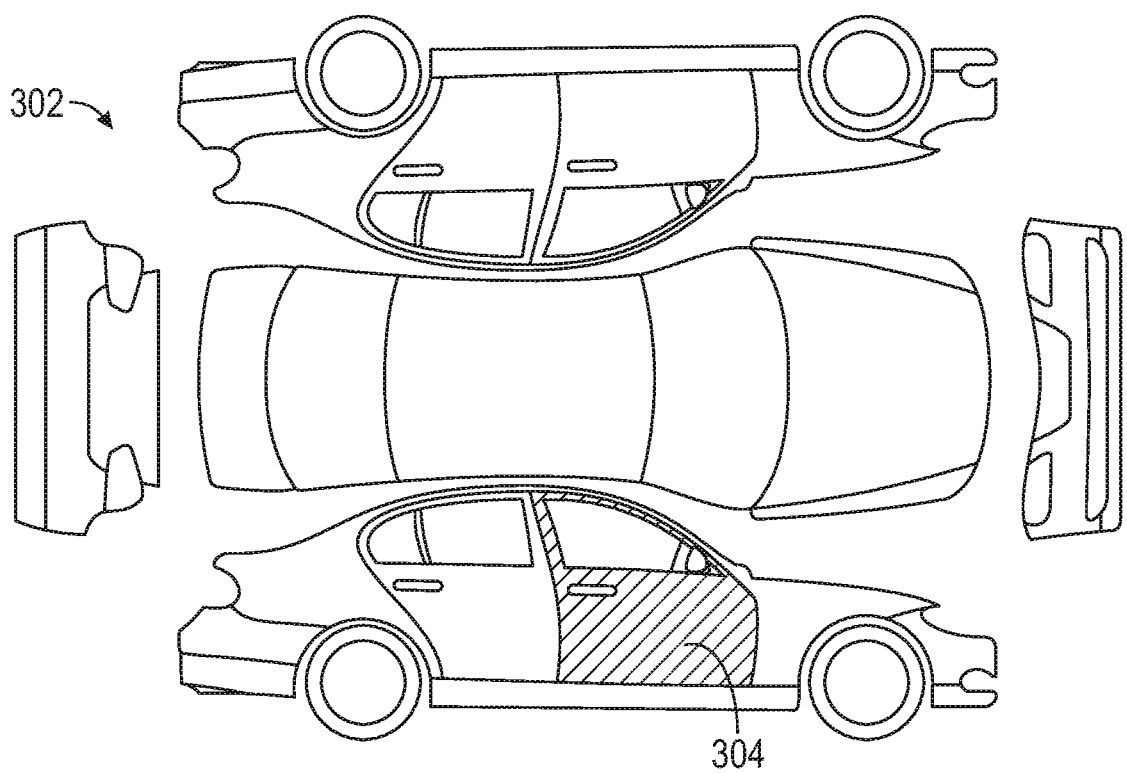
FIG. 4 shows a selection of a surface to be repaired.

Once an article is selected, the individual panels of that articles may be shown on the display device. This enables an operator to select a panel to be repaired. FIG. 4 shows the panels of the vehicle 302 selected in FIG. 3.

The vehicle 302 is composed of multiple panels like left and right front doors and left and right rear doors, etc. An article my subdivided into any number and shape of panels. One or more of the panels may be selected for repair. In FIG. 4, the right front door 304 is selected. Selection of a panel may be done by an input device like a mouse, a keyboard, or any other computer input device. The right front door 304 corresponds to the marked section while the remainder of the car corresponds to the unmarked section. The right front door 304 is rendered with the preliminary matching formula and the remainder of the car is rendered with the target coating. The entire car is rendered on the basis of the true 3D-geometry of the car.

Figure 5:
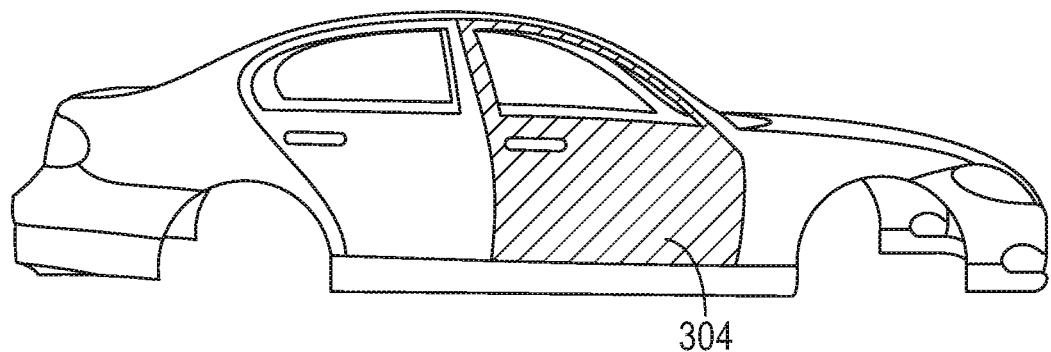
FIG. 5 shows a color according to a selected matching formula being displayed on the selected surface of FIG. 4.

Once the article, a panel to be repaired, and the preliminary matching formulas are selected, the individual matching images can be generated. FIG. 5 exemplarily shows a body of a vehicle with the right front door having applied the color in accordance to one preliminary matching formula. The remote host computer receives the preliminary matching formulas and the 3D-model of the article and renders the image accordingly. Then, this image is transmitted to the computing device and presented to the operator. The image shown in FIG. 5 may be rotated up and down and right and left to view the article from different angles. Furthermore, the image of the article may be viewed under different lighting conditions.

If there is a mismatch between the target color of the vehicle and the color of the repaired panel (right front door 304), blending regions may be defined between the repaired panel and the adjacent regions of the vehicle. A blend box may be drawn near edges of the repaired panel and dragged into unrepaired areas to define the size of the blend area. Thus, mismatch at the boundaries of the repaired and unrepaired areas may be eliminated or at least reduced.

Figure 6:
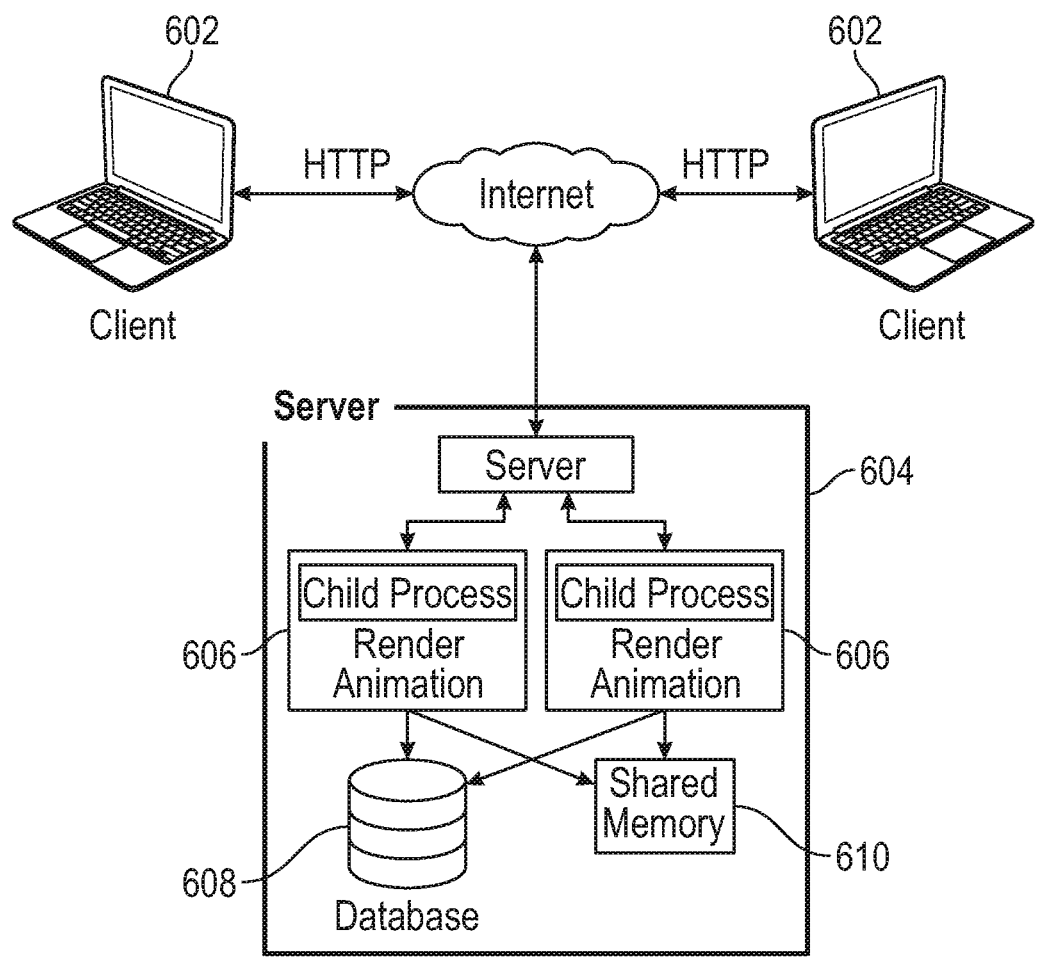
FIG. 6 shows an exemplary configuration of a system according to an exemplary embodiment.

FIG. 6 shows a schematic overview of a system having multiple clients 602 (equivalent to the computing device 80 of FIG. 1) connected to a server 604 (equivalent to the host computer 86 of FIG. 1) via the internet (equivalent to the data connection between the computing device and the host computer). Any number of clients may be connected to the server to make use of the rendering services offered by the server. For example, the HTTP-protocol may be used for data transmission between the clients and the server. The server may be configured to execute the steps described above. Multiple child processes 606 may be assigned individual rendering tasks which are executed by using a database 608 and a memory 610 of the server. The child processes are executed by a processor of the server. The database shown in FIG. 6 corresponds to the first and second databases 95, 105 of FIG. 1.

The clients 606 allow model selection and environment selection as well as selection of preliminary matching formulas. Further parameters of the simulation may be selected, like paint coefficient, body panel table, camera data table.

The selected information is used as a basis for the rendering process executed by the server.

Figure 7:
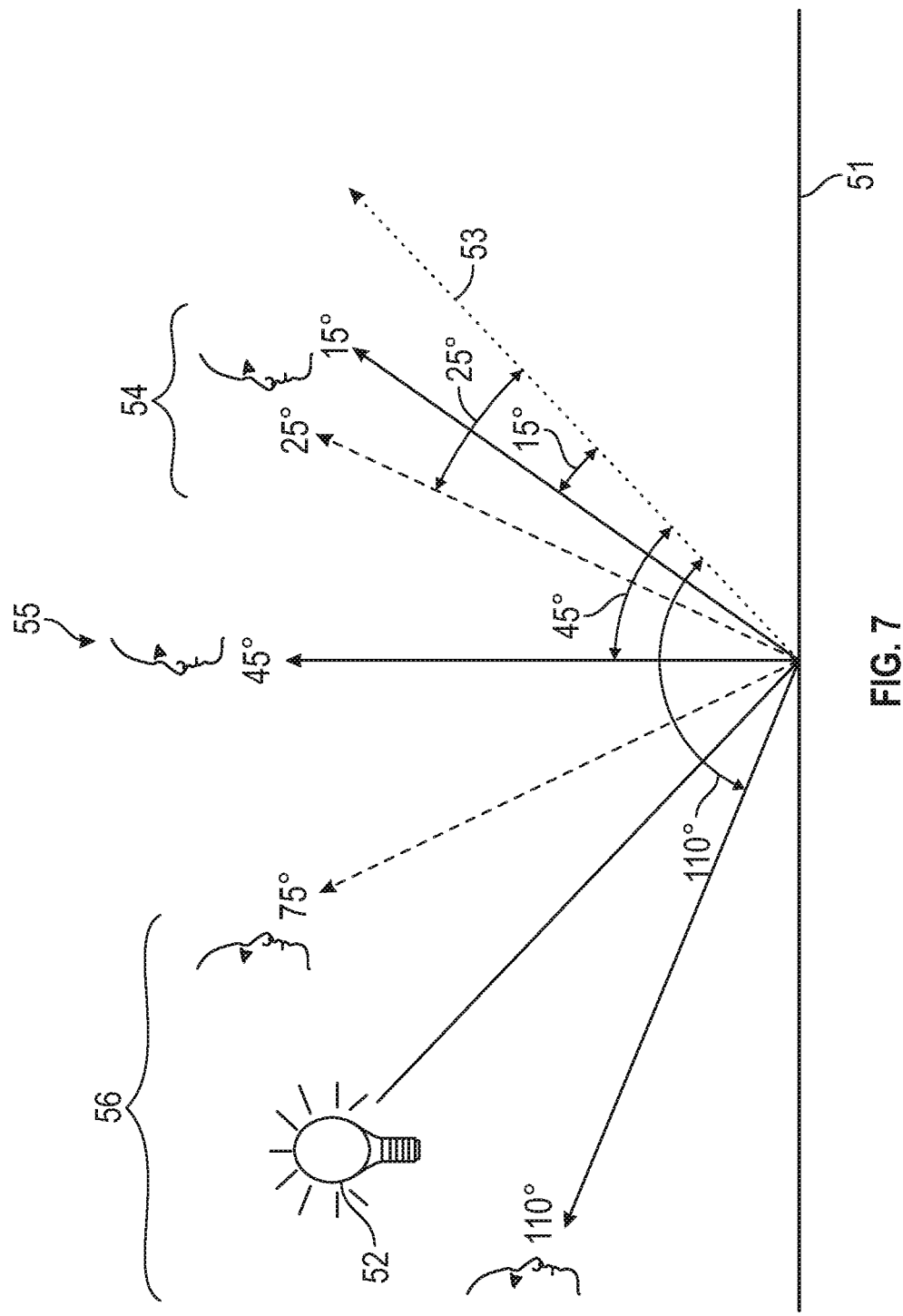
FIG. 7 shows illumination and viewing angles defined in ASTM E2194.

For the sake of completeness, FIG. 7 shows the process of measuring appearance of an article.

Color and appearance of a coating can vary in relation to illumination. A standard procedure was described in ASTM E-2194, herein incorporated in by references. Briefly, when a coating 51 is illuminated by an illumination source 52, such as a light bulb or sun light, at a given angle as shown in FIG. 7, a number of viewing angles can be used, such as, 1) near aspecular angles 54, that are the viewing angles from about 15° to about 25° from the reflection 53 of the illumination; 2) mid aspecular angles 55, that are the viewing angles about 45° from the reflection 53 of the illumination; and 3) far aspecular angles 56, that are the viewing angles from about 75° to about 110° from the reflection 53 of the illumination. In general, color appears to be slightly brighter at near aspecular angles and slightly darker at far aspecular angles.

Images of the 3D-models of the article can display color at one or more, preferably a full range of, aspecular angles. In one example, a three-angle measurement is used as input to a model that generates continuous color over the range of aspecular angle as dictated by the geometry of the vehicle: a near aspecular angle, such as 15°; a mid aspecular angle, such as 45°; and a far aspecular angle, such as 110°.

For solid colors, i.e., colors containing no flakes, pearl or other effect pigments, corresponding color images can be displayed regardless of aspecular angles.

Methods for displaying color and appearance of a coating at one or more aspecular angles are described in aforementioned U.S. patent application Ser. No. 11/58,847, which is incorporated by reference.

Although vehicle and vehicle coating are specifically described in some examples, this disclosure can also be used for other coated articles or article without coating wherein color or appearance of the articles can be identified by article identification information, such as catalog numbers or color codes. Some examples of such coated articles include, but not limited to: home appliances, such as refrigerator, washing machine, dishwasher, microwave ovens, cooking and baking ovens; electronic appliances, such as television sets, computers, electronic game sets, audio and video equipments; recreational equipments, such as bicycles, ski equipments, all terrain vehicles; and home or office furniture, such as tables, file cabinets. Examples of articles without coating that have color and appearance include, but not limited to, engineering polymers, injection molding plastics or polymers, or other synthetic materials such as Conan® available from DuPont, wherein Conan® is a registered trademark of DuPont. Selection of matching formulas for repairing the coatings of the articles or articles without coating can be performed according to the method of this disclosure.

This disclosure can also be used for articles wherein color or appearance of the articles can be identified without article identification information. Examples of articles without article identification information include, but not limited to, a vehicle at some points of OEM production line wherein a vehicle identification number has not yet been assigned, a vehicle wherein a vehicle identification number is not available, or a piece of kitchen counter top wherein identification information is not available. The color data, the appearance data, or both the color and the appearance data can be obtained by measurements using any of the applicable aforementioned methods. One or more repair formulas, such as preliminary matching formulas can be retrieved manually by those skilled in the art. Repair formulas can also be retrieved by using the color data, the appearance data, or both the color and the appearance data. Each of the retrieved repair formulas can be interrelated to color characteristics, appearance characteristics, or both the color and appearance characteristics. Matching images or realistic matching images can be generated based on color characteristics, and optionally the appearance characteristics. The matching images or realistic matching images can be displayed on a display device and one or more matching formulas can be selected from the preliminary matching formulas based on the comparison of the matching images and the article. The realistic matching images can also be displayed at one or more pre-determined aspecular angles. A target image can be generated and displayed, or further displayed as a realistic target image and the realistic target images can also be displayed at one or more pre-determined aspecular angles.

Since color of an article may have been changed after its being manufactured due to weathering or wear, the original manufacturing (OEM) color standard may not match the article that is in need of repair. One advantage of using the combination of measured color data and the stored appearance characteristics is that color can be adjusted to match the article in need of repair.

What is claimed is:

1. A system for displaying one or more images to select one or more matching formulas to match color and appearance of a target coating of an article, said system comprising:
   a first processor;
   a display device;
   a second processor connected to the first processor;
   one or more data input devices;
   a first database containing interrelated repair formulas, color characteristics, and appearance characteristics;
   a second database containing identification information of at least one article, a three-dimensional model of the at least one article or a three-dimensional mapping of a geometry of at least a part of a surface of the at least one article, wherein the article comprises a vehicle; and
   a computer program product that is accessible to the first processor and/or the second processor and performs a computing process comprising the steps of:
   retrieving one or more preliminary matching formulas from the interrelated repair formulas of the first database based on signals received from the one or more data input devices;
   selecting the one article or the three-dimensional mapping of the geometry of the one article from the second database and receiving a marked section of the surface of the article, wherein the marked section of the surface of the article is a body panel of the vehicle, wherein the body panel has a specific shape and three-dimensional geometry;
   generating individual matching images containing the marked section and an unmarked section adjacent to the marked section, wherein the individual matching images are generated in the marked section based on the color characteristics, the appearance characteristics, and the one article or the three-dimensional mapping of the geometry of the one article selected from the second database and interrelated to each of the one or more preliminary matching formulas; and
   displaying the individual matching images on the display device, wherein displaying the individual matching images comprises rendering a true three-dimensional model of the marked section.

2. The system of claim 1, further comprising a 3D-scanner configured to acquire the three-dimensional mapping of the geometry of at least the part of the surface of the article and to transmit said geometry to the second database.

3. The system of claim 1, wherein the computing process further comprises the steps of:
   identifying a repair area of the article and displaying the individual matching images on the display device with the identified repair area adopting the one or more preliminary matching formulas.

4. The system of claim 3, further comprising:
   a color measuring device functionally coupled to the second processor for obtaining color data of the article, wherein the obtained color data represent the target coating of the article, and
   an appearance measuring device functionally coupled to the second processor for obtaining appearance data of the article,
   wherein the computing process further comprises the steps of:
   receiving the color data; and
   receiving the appearance data;
   wherein the individual matching images are generated in the unmarked section of the article based on the target coating, and based on the appearance data.

5. The system of claim 1, wherein displaying the individual matching images comprises displaying the marked section with a matching coating and displaying the unmarked section with the target coating; the method further comprising comparing the matching coating to the target coating on the true three-dimensional model of the marked section.

6. The system of claim 4, wherein the appearance measuring device comprises an imaging device.

7. The system of claim 4, wherein the computing process further comprises the steps of:
   indicating a blend region on the surface of the article;
   rendering a color blend from the repair area to the color data of the article obtained by the color measuring device.

8. The system of claim 1, wherein the second processor and the first processor are located remote from each other.

9. The system of claim 1, wherein the computing process comprises the step of rotating the article on the display device and rendering the individual matching images from different viewing angles.

10. The system of claim 1, wherein the three-dimensional model of the at least one article is partitioned into multiple segments; and
    wherein the computing process comprises the step of selecting one segment of the multiple segments and applying the one or more preliminary matching formulas to the selected segment.

11. The system of claim 1, wherein the computing process comprises the step of applying different lighting conditions to the individual matching images.

12. The system of claim 9, wherein rotating the article comprises rotating the article up and down, and rotating the article right and left.

13. The system of claim 1, wherein the second processor is connected to the first processor via a wired or wireless network.

14. The system of claim 1, wherein the display device is selected from a digital display device, an optical display device, a print display device, or a combination thereof.

15. The system of claim 1, wherein the one or more data input devices are selected from a digital input device, an optical input device, an electromagnetic input device, or a combination thereof.

16. The system of claim 1, wherein each of the individual matching images is displayed as realistic matching image.

17. A method that is carried out by one or more processors for displaying one or more images to select one or more matching formulas to match color and appearance of a target coating of an article, said method comprising:

retrieving, by the one or more processors, one or more preliminary matching formulas from a multitude of repair formulas from a first memory storing a first database, wherein the first database comprises interrelated repair formulas, color characteristics, and appearance characteristics;

selecting, by the one or more processors, one article or a three-dimensional mapping of a geometry of one article from a second memory storing a second database and marking a part of a surface of the article as a marked section, wherein the second database contains identification information of at least the one article, a three-dimensional model of the at least one article or the three-dimensional mapping of the geometry of at least the part of the surface of the at least one article, and wherein the article comprises a vehicle;

generating, by the one or more processors, individual matching images containing the marked section and an unmarked section adjacent to the marked section, wherein the individual matching images are generated in the marked section based on the color characteristics, the appearance characteristics, and the one article or the three-dimensional mapping of the geometry of the one article selected from the second database; and displaying the individual matching images on a display device, wherein displaying the individual matching images comprises displaying a true three-dimensional geometry of the vehicle.

18. The method of claim 17, further comprising the step of:

acquiring the three-dimensional mapping of the geometry of at least the part of the surface of the article and transmitting said geometry to the second database.

19. The method of claim 17, further comprising the step of:

obtaining color data of the article, wherein the obtained color data represent the target coating of the article;

generating the individual matching images in the unmarked section of the article based on the target coating.

20. A system for computing one or more images indicating one or more matching formulas to match color and appearance of a target coating of an article, said system comprising:

a first processor configured to receive input signals from at least one data input device;

a memory that stores a first database containing interrelated repair formulas, color characteristics, and appearance characteristics;

the memory storing a second database containing identification information of at least one article, a three-dimensional model of the at least one article or a three-dimensional mapping of a geometry of at least a part of a surface of the at least one article; and a computer program product that is accessible to the first processor and performs a computing process comprising:

retrieving one or more preliminary matching formulas from the interrelated repair formulas of the first database based on the input signals;

selecting the one article or the three-dimensional mapping of the geometry of the one article from the second database and receiving a marked section of the surface of the article;

generating individual matching images containing the marked section and an unmarked section adjacent to the marked section, wherein the individual matching images are generated in the marked section based on the color characteristics, the appearance characteristics, and the one article or the three-dimensional mapping of the geometry of the one article selected from the second database and interrelated to each of the one or more preliminary matching formulas; and transmitting the individual matching images for being displayed on a display device.

\* \* \* \* \*